(12) United States Patent
Wrage

(10) Patent No.: US 8,056,490 B2
(45) Date of Patent: Nov. 15, 2011

(54) WATERCRAFT HAVING A KITE-LIKE ELEMENT

(75) Inventor: Stephan Wrage, Hamburg (DE)

(73) Assignee: Skysails GmbH Co. KG, Hamburg (DE)

( * ) Notice: Subject to any disclaimer, the term of this patent is extended or adjusted under 35 U.S.C. 154(b) by 0 days.

(21) Appl. No.: 12/661,454

(22) Filed: Mar. 17, 2010

(65) Prior Publication Data

US 2010/0192825 A1    Aug. 5, 2010

Related U.S. Application Data

(63) Continuation-in-part of application No. 11/661,851, filed as application No. PCT/EP2005/009530 on Sep. 5, 2005, now abandoned.

(30) Foreign Application Priority Data

Sep. 6, 2004   (DE) .................... 20 2004 013 841 U

(51) Int. Cl.
    *B63B 17/00* (2006.01)
(52) U.S. Cl. .................................. 114/39.21
(58) Field of Classification Search ............... 114/39.1, 114/39.21, 39.29, 102.1–115
    See application file for complete search history.

(56) References Cited

U.S. PATENT DOCUMENTS

| | | | |
|---|---|---|---|
| 2,433,344 A | 12/1947 | Crosby | |
| 3,180,090 A | 4/1965 | Royal et al. | |
| 3,227,398 A * | 1/1966 | Struble, Jr. | 244/1 R |
| 4,102,291 A | 7/1978 | Sebald | |
| 4,497,272 A | 2/1985 | Veazey | 114/102.29 |
| 5,094,638 A | 3/1992 | Kobayashi | 440/33 |
| 5,271,351 A | 12/1993 | Horiuchi et al. | |
| 5,546,695 A | 8/1996 | Langer | 43/44.98 |
| 5,642,683 A | 7/1997 | Bedford | 114/102.1 |
| 6,254,034 B1 | 7/2001 | Carpenter | |
| 6,523,781 B2 * | 2/2003 | Ragner | 244/153 R |
| 6,616,402 B2 | 9/2003 | Selsam | |
| 6,918,346 B2 | 7/2005 | Grenier | 114/102.16 |
| 7,046,934 B2 * | 5/2006 | Badesha et al. | 398/121 |
| 2002/0139603 A1 | 10/2002 | Aiken et al. | |
| 2003/0033968 A1 | 2/2003 | Thomson | 114/90 |

FOREIGN PATENT DOCUMENTS

| | | |
|---|---|---|
| DE | 38 17 073 A1 | 12/1988 |
| FR | 2 781 195 A | 1/2000 |
| GB | 2 098 946 | 12/1982 |
| GB | 2 098 946 A | 12/1982 |

(Continued)

OTHER PUBLICATIONS

J.F. Wellicome et al, "Ship Propulsive Kites—An Initial Study", University of Southampton, ISSN 0140 3818 SSSU 19, pp. I-71

(Continued)

*Primary Examiner* — Edwin Swinehart

(74) *Attorney, Agent, or Firm* — Alix, Yale & Ristas, LLP

(57) ABSTRACT

The invention relates to a water craft comprising a kite-type element, which is connected to said water craft by means of a traction cable. Said water craft is characterized in that the kite-type element is equipped with adjusting devices, which are supplied with energy from the water craft, said energy being transmitted in the traction cable or by an element on the latter.

14 Claims, 6 Drawing Sheets

FOREIGN PATENT DOCUMENTS

| | | |
|---|---|---|
| GB | 2 098 950 A | 12/1982 |
| GB | 2 294 666 A | 5/1996 |
| JP | 4237877 | 8/1992 |
| JP | 5286492 | 11/1993 |
| JP | 10218085 | 8/1998 |
| WO | WO 0209030 A1 | 10/2002 |
| WO | WO 03/097448 A | 11/2003 |

OTHER PUBLICATIONS

Notice of Reasons for Rejection from the Japanese Patent Office—Dec. 7, 2010.
English Abstract for Japanese Patent No. JP10218085.
English Abstract for Japanese Patent No. JP5286492.
English Abstract for Japanese Patent No. JP4237877.

* cited by examiner

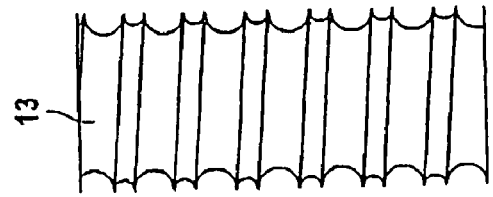
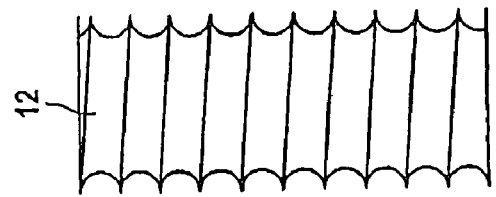
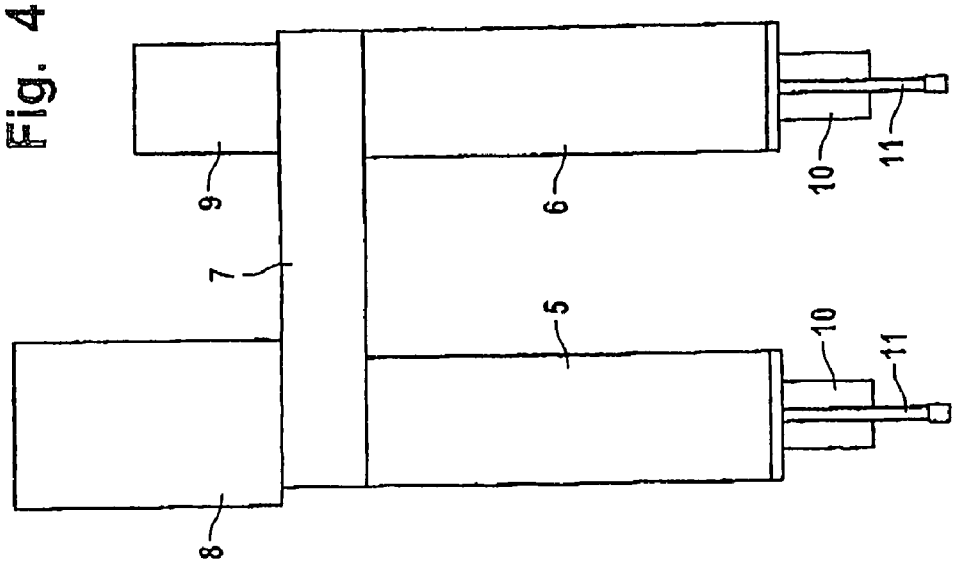

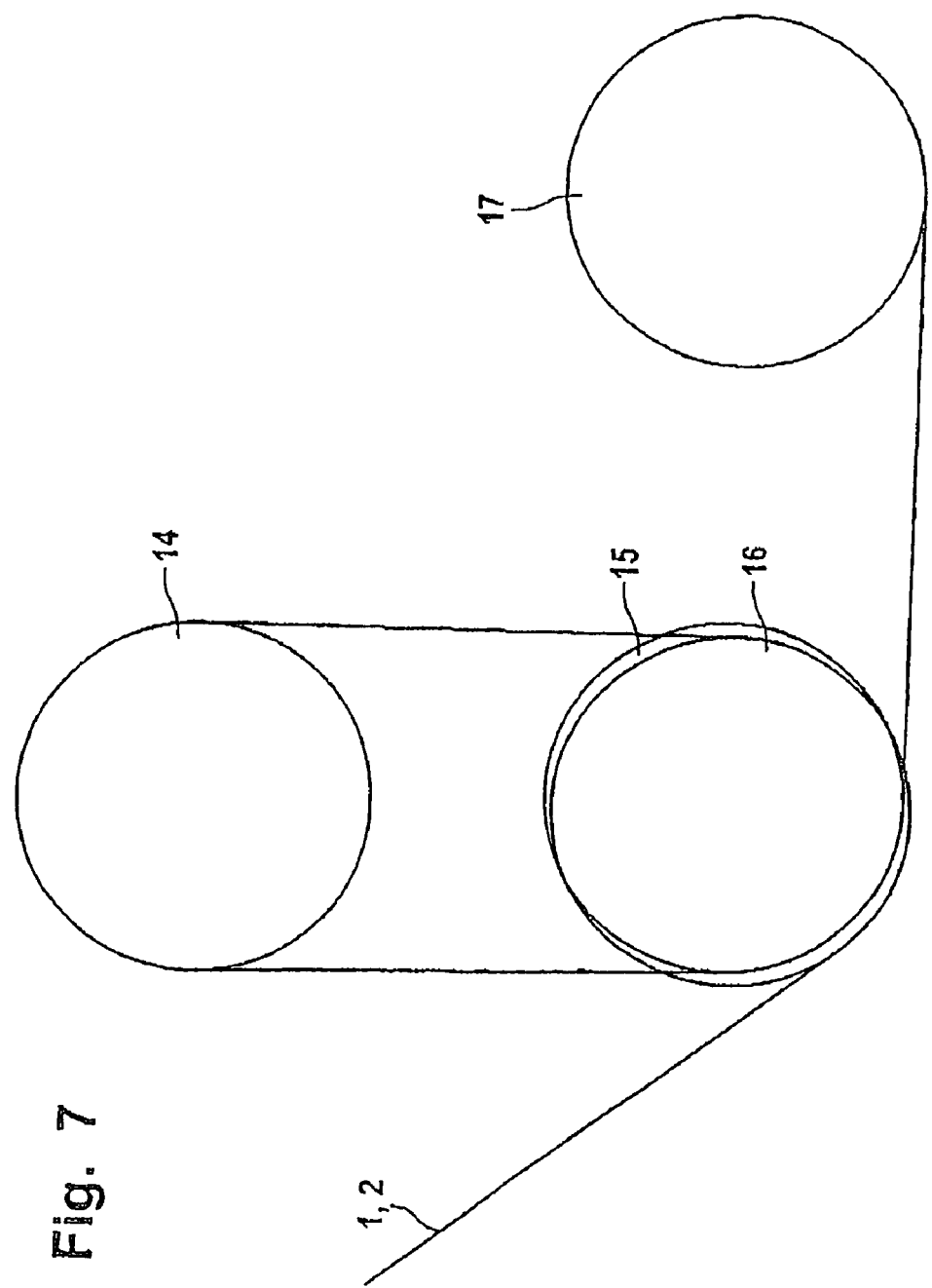

WATERCRAFT HAVING A KITE-LIKE ELEMENT

RELATED APPLICATION

This application is a continuation-in-part of, and claims the benefit of, U.S. patent application Ser. No. 11/661,851 filed Sep. 28, 2007, the disclosure of which is incorporated herein by reference in its entirety.

BACKGROUND

The invention relates to a watercraft having a kite-like element, which is connected to the watercraft by a hawser.

In one already known watercraft (WO 01/192102 A1), it is possible for the kite-like element to be connected to the watercraft by a plurality of hawsers. In this case, the kite-like element is used to propel the vessel by wind, in which case this propulsion system can be operated exclusively by wind, or else the propulsion system uses the wind only to assist the mechanical propulsion system in order in this way to save fuel or to increase the speed. The kite-like element can be controlled by the plurality of hawsers. A plurality of hawsers have the disadvantage, however, that they must be hauled in and paid out individually in order to retrieve or to deploy the kite-like element. In addition, the plurality of hawsers could also become entangled. The cited document therefore also discloses a watercraft having a kite-like element of the type mentioned initially, in which only one hawser is provided, by means of which the stated problems are avoided.

However, this has the disadvantage that the kite-like element can no longer be controlled directly.

SUMMARY

A kite-like element is provided with adjusting devices which are supplied from the watercraft with power which is transmitted in or on the hawser. The adjusting devices may include motor driven rocker elements to which control lines from the kite-like element are attached. Such an arrangement is shown and described in U.S. patent application Ser. No. 11/578,825, filed Oct. 19, 2005, now U.S. Pat. No. 7,672,761, issued Mar. 2, 2010, the disclosure of which is incorporated herein by reference in its entirety. The adjusting devices may be operated by electric motors driven by an electrical generator or by a fuel cell that is used to generate electricity for the electric motors. Mechanical motors also could be used to drive the adjusting devices. Such motors may include turbines or rotors with vanes that provide rotational motion for rotating a corresponding part on the adjusting device for the kite-like element. The adjusting devices, including the motors, are mounted on the kite-like element or in a container attached to the kite-like element.

Adjusting devices are therefore provided, by means of which the shape of the sail of the kite-like element, the incidence angle, opening valves, the reefing processes and the like can be changed or provided. In this case, the control process can be carried out automatically by means of sensors provided on the kite-like element or, and this is particularly advantageous, by radio from the vessel. In this case, there are no problems in sending the signals to the kite-like element. However, a power supply is required for the adjusting devices. This power supply is now provided from the watercraft, to be precise in or on the hawser.

In one advantageous embodiment, a power transmission element which connects the watercraft and the kite-like element is attached to the hawser. In another embodiment, the hawser is in the form of a tension-resistant power transmission element which connects the watercraft and the kite-like element.

The power transmission element may be an electrical cable. The electrical cable may in this case, in particular, be a carbon-fiber cable. The entire hawser could thus also be composed of carbon fibers. In a hawser such as this, the hawser braids lie parallel to one another and are held together only by a casing. In this case, by way of example, the braids can be electrically split in two so that one half of the braids is insulated from the other half, so that the carbon-fiber cable can be used for the forward path and return path of the electric current, and there is no need to provide any extra conductors. In this case, the braids which are used to carry electrical power can also at least partially absorb the tensile force. On the outside, the cable is insulated by a casing.

If the electrical cable is in the form of a hawser, then it can be provided with appropriate reinforcing cables or wires in order to provide it with sufficient tensile strength.

Electrical power can then be transmitted through this power transmission element from the watercraft to the kite-like element in order to supply it with electrical power. However, the electrical cable can also be used to transmit control signals from the watercraft to the kite-like element. However, these control signals could also be transmitted, for example, by radio.

In another advantageous embodiment, the power transmission element is a flexible tube. A fluid can then be transmitted through this power transmission element to the kite-like element, acting on appropriate operating elements there.

The power transmission element in another advantageous embodiment is an optical waveguide, in particular a glass fiber. Light can then be transmitted through this power transmission element, and can be converted to electrical power by suitable transducers in the kite-like element.

If the power transmission element and the hawser are combined to form a single element, then this results in less aerodynamic drag. Handling on the winch is easier than if a plurality of separate elongated elements had to be wound up or unwound. This also results in the hawser/power transmission element being lighter in weight.

The disadvantage is that the power transmission element and the cable must be capable of expanding to approximately the same extent and this must be true over the operating temperature range. If a flexible tube is used, this must not be trapped on the winch by the cable when on load, or while being wound up.

If it is not possible to select the power transmission element such that it can expand to precisely the same extent as the hawser, the power transmission element must be arranged such that it can slide with respect to the hawser. This can be achieved by a sliding layer, if the power transmission element is arranged within the hawser. If they can expand to approximately the same extent, the hawser and the power transmission element can be adhesively bonded to one another by, for instance, a silicon based glue.

If a flexible tube is used, this is expediently held by a raised pressure, since in this case the internal pressure in the flexible tube prevents kinking or pinching.

In another embodiment, the power transmission element and the hawser are separated, but are connected to one another, expediently by brackets. The advantage is that the power transmission element and the hawser may have different expansion capabilities, if the power transmission element can move relative to the hawser. If there is no need to take account of them having the same expansion capability, better material optimization is possible. In addition, maintenance can be better carried out. The disadvantages are that the aerodynamics are poorer, handling on the winch is more difficult, and the weight may be higher.

As an alternative to the use of brackets for attachment as mentioned, in which case the brackets are expediently secured against sliding on the hawser, attachment is possible, for example, by means of splicing, a Velcro strip between the cable and the power transmission element, bindings, fixed clips or sheathing (wear-resistant envelope). The larger the gap between the power transmission element in the hawser, the greater is the aerodynamic drag.

If the hawser and the power transmission element are separate elements, then it is important for the two elements to be able to move with respect to one another within certain limits. In this solution, it is highly advantageous for the power transmission element to move with respect to the hawser, and not vice versa.

When a hawser and a power transmission element that is separate from it are used, the warping drum must be adapted such that it has two different radii, so that the hawser and the power transmission element can be rolled up in parallel on the same warping drum. In this solution, it is important for the power transmission element to be able to expand to a greater extent than the hawser, since the tensile load must not be exerted through the power transmission element.

The overall system must be optimized to the maximum ultimate load/working load, minimum expansion, minimum drag, minimum mass and maximum power transportation capability.

It is self-evident that the power transmission element must be connected by appropriate contact elements for power transmission to the watercraft and to the kite-like element.

If a flexible tube is used, compressed air, in particular dried and/or heat-compressed air, is particularly advantageous as the power transmission fluid, since, otherwise, moisture could freeze in the flexible tube which would not only increase the weight of the hawser but would also result in the risk of the flexible tube being obstructed, so that no more compressed air can be transmitted. To convert the compressed gas into mechanical energy to drive the adjusting device, a commercially available pneumatic drive may be provided.

In another advantageous embodiment, a combustible gas, in particular hydrogen or methane, is used rather than compressed air as the power transmission fluid. A fuel is then available in the kite-like element, and can likewise be used to provide a drive. The combustible gas could drive an internal combustion engine or gas engine at the kite-like element to provide rotational motion for the adjusting device. Methane and hydrogen could drive a fuel cell in the kite-like element or in a pod attached to it to convert the gas into electricity to drive an electric motor. A high-density fluid, that is to say in particular liquids, is less suitable for use as the power transmission medium since the corresponding fluid or liquid column in the flexible tube would be very heavy.

A winch is expediently provided for the hawser and/or for the power transmission element on the watercraft, and is provided with a guide surface or a guide plate in front of the warping drum, for alignment of the hawser and/or of the power transmission element.

Two, three or even more warping drums with one cable store are expediently provided, thus making it possible to ensure that the hawser, and the assembly formed by the hawser/power transmission element do not rub on the wall of the warping drum. When using two or three warping drums, between which the hawser/power transmission element runs backwards and forwards, a looping angle of at least 450° can nevertheless be achieved, which is adequate for the tensile loads to be absorbed.

For safety reasons (for example in the event of transmission breakage, etc.), each warping drum expediently has its own emergency brake, which may expediently be in the form of a strap brake. An adjustable disk brake can be provided for normal braking. A cable store can be arranged behind the warping drums, and may be in the form of a drum, which is likewise driven and braked.

If the hawser and the power transmission element are arranged alongside one another, a double-start warping drum profile is expediently used, in order that the hawser and the power transmission element can be held in separate grooves matched to their cross section.

The above-mentioned expedient embodiments with the winch having a guide surface and a guide plate, with 2, 3 or more warping drums with a cable store, with the emergency brake for each warping drum and with a double-start warping drum profile, are particularly advantageous for the situation mentioned above, in which the hawser also has a power transmission element, and/or is connected to a power transmission element. These particular advantages of the winch also exist, however, in situations in which only a hawser is provided, without any power transmission.

The power supply for the kite-like element can be used not just for adjustment. In fact, electrical power can be transmitted, or can be generated in the kite-like element on the basis of the other power supply, in order to provide an operating voltage for control purposes, and for the sensors, etc. A rechargeable battery is expediently provided in the kite-like element or in the pod, for storage of electrical energy.

In particular (but not exclusively) in situations where an electrical cable is used as the power transmission element, there is a risk of lightning strike or of overvoltages resulting from electrostatic effects. Lightning protection and/or protection against electrostatic charging and discharging are thus expediently provided. The lightning protection and/or the protection against electrostatic charging and discharging are/is however, not restricted to the situation in which a power transmission element is provided.

BRIEF DESCRIPTION OF THE DRAWINGS

The invention will be described in the following text using, by way of example, advantageous embodiments and with reference to the attached drawings, in which, illustrated schematically:

FIG. 4 shows a winch with two warping drums;

FIG. 5-6 show profiles of different warping drums;

FIG. 7 shows a cable guide with three warping drums and a cable store;

DETAILED DESCRIPTION

Figure 1:
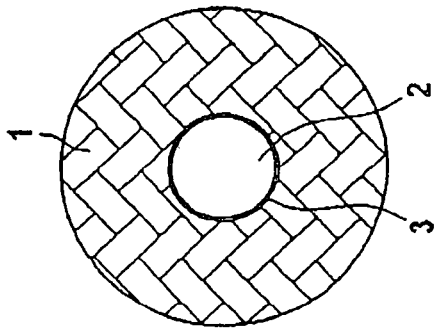

FIG. 1 shows a hawser 1 (or its tension-resistant fiber structure) in which a power transmission element 2 is arranged centrally and is separated by a layer 3 from the main part 1 of the hawser. The power transmission element 2 may be a flexible tube, in which case the element 3 is then the flexible tube wall. The element 2 may, however, also be a cable, in which two semicircular conductors are separated from one another by insulation and are surrounded by insulation 3.

The hawser 1 and power transmission element 2 may have sliding movement with respect to each other. This can be accomplished by providing a coating or layer of a slidable material on the inner surface of the hawser and/or on the outer surface of the power transmission element 2. If the power transmission element is arranged within the hawser, as shown in FIG. 1 for example, the element 3 of FIG. 1 could be a PTFE coating or a layer of nano particles on either the inner surface of the hawser 1 or outer surface of the power transmission element 2. If the power transmission element 2 is an electric cable, PTFE insulation could surround the cable to provide for the sliding movement.

Figure 3:
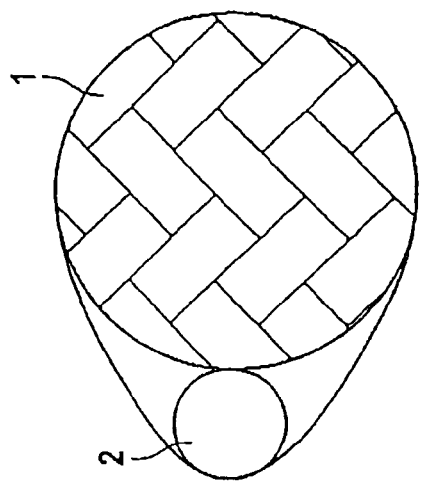
FIGS. 1-3 show cross sections through three different hawsers with an integrated power transmission element.
Figure 2:
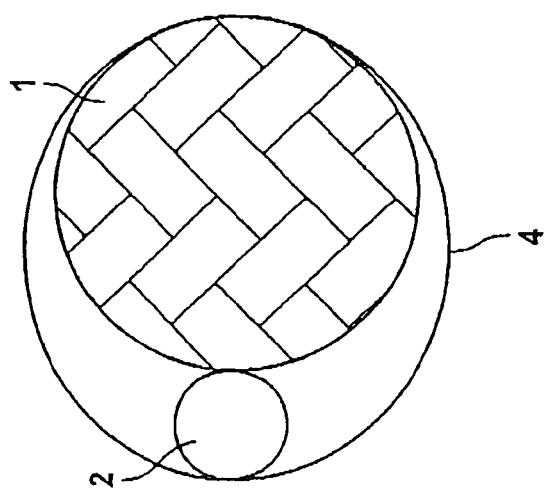

In the embodiment shown in FIGS. 2 and 3, the main part 1 of the hawser and the power transmission element 2 are surrounded by common envelopes 4.

Figure 14:
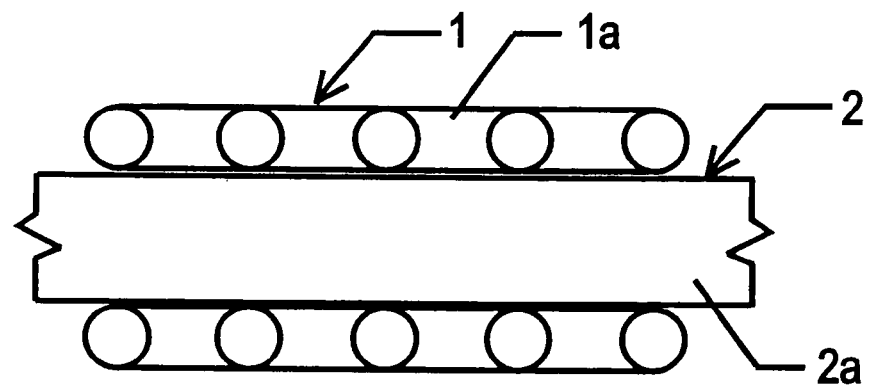
FIG. 14 is a schematic cross-sectional view of the rope strands of the hawser surrounding an electric cable.
Figure 15:
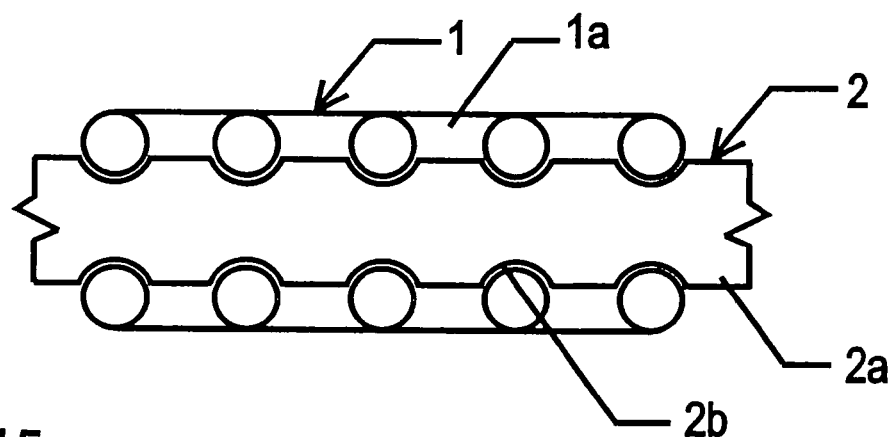
FIG. 15 is a schematic cross-sectional view of the rope strands of the hawser having a shrink fit on the electric cable after the rope strands have been treated.

Another embodiment of securing the power transmission element 2 in the hawser 1 is shown in FIGS. 14 and 15. In these Figures, the power transmission element 2 is in the form of an electric cable 2a with the rope strands 1a of the hawser 1 surrounding the electrical cable 2a. The rope strands 1a are arranged around the outer surface of the electric cable 2a. As shown in FIG. 15, when the rope strands 1a are treated by exerting a tensile force and/or heat in order to improve the properties, they will partly penetrate into the outer regions of the circumference of the electric cable 2a. This condition will remain after the treatment as shown in the FIG. 15. The strands 1a, after treatment, of the rope of the hawser 1 are partly inserted into grooves 2b in the electric cable 2a which have been formed by the rope strands 1a. Thus, there is a shrink fit provided between the rope strands 1a of the hawser 1 and the electric cable 2a.

It is well known in the field or producing ropes, and also in the field of composite materials which contain fibers, that the elastic properties will depend on the treatment of the fibers or strands of the rope. Thus, the rope of the hawser can be made to have the same properties under tensile force as the power transmitting cable 2. In this case the rope of the hawser 1 and the power transmitting cable 2 may be glued together by, for example, silicon based glue. On the other hand, steel can be used for the rope or outer tensile-force transmitting part and copper for the electric cable. The lengthening of the device under tensile force then is determined by the steel because it withstands the tensile forces more than the copper does. The copper can be deformed more easily. Thus, when the lengthening of the steel is limited due to the tensile strength of the steel, the copper, because it is softer, can follow the lengthening, particularly, if the two are glued together.

FIG. 4 shows a winch with two warping drums 5, 6 which are connected to one another by means of a transmission 7. The warping drum 5 is in this case connected to a motor 8, and the warping drum 6 is connected to a brake 9. The two warping drums 5, 6 also have emergency brakes 10, in particular in the form of a strap brake. The electrical power supply is shown at 11.

The warping drum 12 in FIG. 5 has a single-start profile for holding the hawser/power transmission element, which is in an integrated form. The warping drum 13 in FIG. 6 has a double-start profile, in which the hawser is held in one of the profile grooves, and the power transmission element is held in the other.

FIG. 7 shows an arrangement with three warping drums 14, 15, 16 and a cable store 17, by means of which the hawser 1 and the power transmission element 2 can be wound up and unwound.

Figure 10:
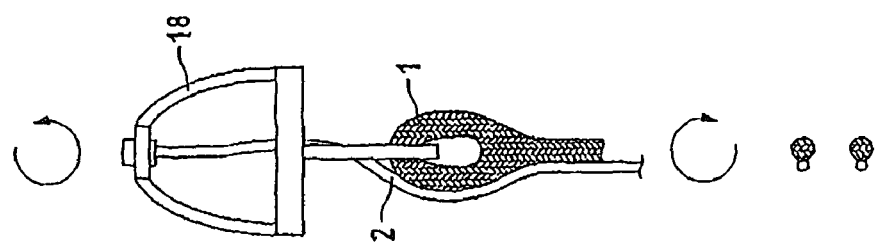
FIGS. 8-10 show flanges with sheaves by means of which a hawser/power transmission element are attached to the kite-like element.
Figure 9:
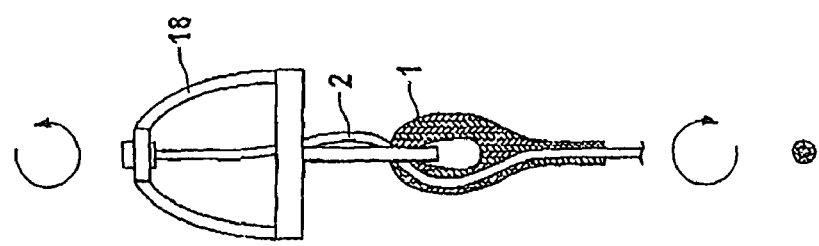
Figure 8:
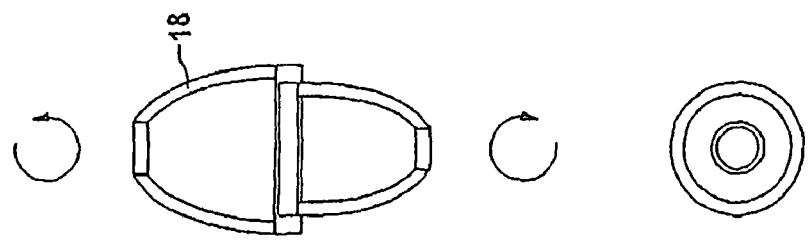

FIGS. 8 to 10 show sheaves 18 in order to indicate various possible ways indicating how the hawser 1 and the power transmission element 2 can be connected to the kite-like element which is not shown in the figures.

Figure 11:
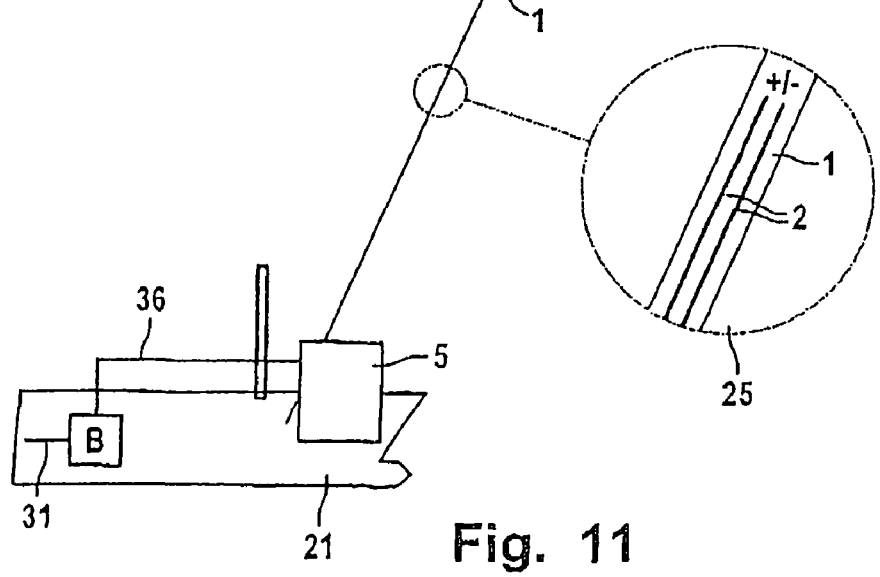
FIG. 11 shows a schematic illustration of the watercraft and of the kite-like element.

FIG. 11 shows a watercraft 21, illustrated schematically, which has a winch 5 which holds a hawser 1. This hawser is connected to the control pod 22 of a kite-like element 23. This control pod 22 can be used to match the hawsers 24 for the kite-like element 23 to the wind conditions and maneuver conditions. An enlarged illustration of the hawser 1 with the two conductors for an electrical cable (2) is shown in the circle 25. The control pod 22 is connected by means of cable insulators 26 to the hawsers 24, in order in this way to provide lightning protection and protection against electrostatic discharges. Corresponding cable insulators may alternatively or additionally be provided between the control pod 22 and the hawser 1.

Figure 12:
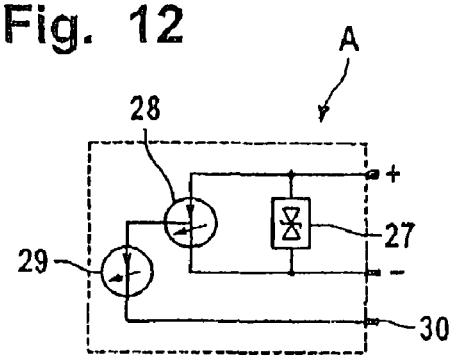
FIG. 12 shows a detailed illustration of the overvoltage protection A in the pod.
Figure 13:
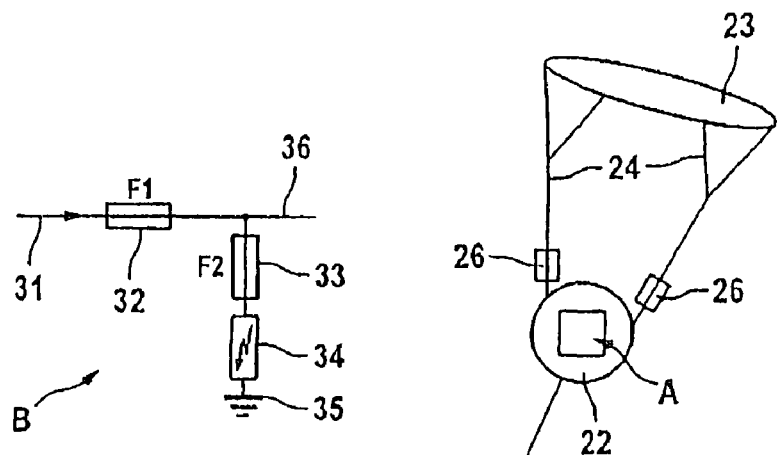
FIG. 13 shows a detailed illustration of the overvoltage protection B on the watercraft.

However, the lightning or overvoltage protection is not restricted to these cable insulators 26. In fact, the electrical circuit A which is not shown in any more detail in FIG. 12, is also provided in the control pod 22. The two conductors in the cable 2 are annotated "+" and "−", and a voltage-dependent resistor 27 is located between them, whose resistance decreases as the voltage rises. 28 and 29 denote surge arrestors. A surge arrestor is in this case an element which acts as an insulator at normal operating voltages but, when relatively high voltages occur, dissipates or shorts them. The surge arrestor may in this case be designed in a similar manner to a capacitor as a tube with a center electrode and a wall electrode, or as a flat capacitor element with two plates. The two electrodes or plates are in this case arranged a short distance apart, which is sufficient for the element to act as an insulator at normal operating voltages. When the operating voltages are relatively high, a current then flows between the two electrodes or plates, thus dissipating the overvoltage. The higher the voltage and, as mentioned, the lower the resistance of the resistor 27, the greater the amount of current which can be dissipated via the surge arrestor 28, 29 without endangering the installed electronics. The dissipation of the overvoltage (residual voltage from the surge arrestor to ground) is also shown at 30.

The circuit B is arranged in the watercraft. 31 is in this case the supply line from the vessel generator, 32 is a fuse on the supply circuit for the cable walls 5. 33 is a fuse for the overvoltage protection 34. 35 is the ground, that is to say the vessel body or the water, and 36 is the supply line to the winch 5.

The invention claimed is:

1. A watercraft having a kite element capable of propelling the watercraft by wind and which is connected by a hawser to the watercraft, said kite element being provided with adjusting devices for control of said kite element and which are supplied from the watercraft with power which is transmitted along the hawser by a power transmission element which connects the watercraft and the kite element, and said power transmission element being attached to the hawser and arranged in a cavity which extends along the length of the hawser said hawser surrounding said power transmission element and having a shrink fit thereon.

2. The watercraft as claimed in claim 1, characterized in that the hawser is in the form of a tension-resistant power transmission element which connects the watercraft and the kite-like element.

3. The watercraft as claimed in claim 1, characterized in that the power transmission element is an electrical cable.

4. The watercraft as claimed in claim 1, characterized in that the power transmission element is an optical waveguide.

5. The watercraft as claimed in claim 1, characterized in that the power transmission element is adhesively bonded to the hawser.

6. The watercraft as claimed in claim 3, characterized in that the cable is also used for signal transmission.

7. The watercraft as claimed in claim 1, characterized in that the watercraft has a winch for the hawser, said winch being provided with a warping drum.

8. The watercraft as claimed in claim 7, characterized in that the winch includes a plurality of warping drums having a cable store.

9. The watercraft as claimed in claim 8, characterized in that each warping drum is provided with its own emergency brake.

10. The watercraft as claimed in claim 1, characterized in that the kite element or hawser is provided with lightning protection.

11. The watercraft as claimed in claim 2, characterized in that the electrical cable is a carbon-fiber cable.

12. The watercraft as claimed in claim 4, characterized in that the optical waveguide is a glass fiber.

13. The watercraft as claimed in claim 1, characterized in that the kite element or hawser is provided with protection against electrostatic charging and discharging.

14. The watercraft of claim 1 wherein said adjusting device includes an electric motor at said kite element and said power transmission element supplies power to said motor.

* * * * *